United States Patent [19]

Nall et al.

[11] Patent Number: 4,483,223
[45] Date of Patent: Nov. 20, 1984

[54] PORTABLE LATHE

[75] Inventors: Lawson H. Nall, Folsom; Richard E. Miller, Citrus Heights, both of Calif.

[73] Assignee: Tri Tool Inc., Rancho Cordova, Calif.

[21] Appl. No.: 482,721

[22] Filed: Apr. 7, 1983

[51] Int. Cl.³ ............................................. B23B 5/16
[52] U.S. Cl. ....................................... 82/4 C; 82/4 R
[58] Field of Search ................... 82/4 R, 4 C, 76, 77, 82/78; 30/97; 144/205

[56] References Cited

U.S. PATENT DOCUMENTS

| | | |
|---|---|---|
| 1,099,215 | 6/1914 | Sullivan . |
| 1,301,759 | 4/1919 | Stewart . |
| 1,518,563 | 12/1924 | Claybourn ............................ 82/4 R |
| 1,849,381 | 3/1932 | Pealer . |
| 2,501,298 | 2/1950 | Winchell ........................ 74/424.8 A |
| 2,672,682 | 3/1954 | Studebaker et al. . |
| 2,769,234 | 11/1956 | Young . |
| 3,202,190 | 8/1965 | Gill . |
| 3,630,109 | 12/1971 | MacMichael ........................ 82/4 C |
| 3,733,939 | 5/1973 | Paysinger et al. . |
| 3,839,791 | 10/1974 | Feamster . |
| 3,875,831 | 4/1975 | Beauloye ............................. 82/4 C |
| 3,908,491 | 9/1975 | Gilmore ................................ 82/4 C |
| 4,050,836 | 9/1977 | Anders ................................. 82/4 C |
| 4,271,733 | 6/1981 | Stone ................................... 82/4 C |
| 4,322,022 | 3/1982 | Bergman ........................ 74/424.8 A |
| 4,397,202 | 8/1983 | Mayfield et al. ..................... 82/4 R |

*Primary Examiner*—Leonidas Vlachos
*Assistant Examiner*—Jerry Kearns
*Attorney, Agent, or Firm*—Bacon & Thomas

[57] ABSTRACT

A portable lathe is disclosed which has a compact arrangement of an automatic tool feed mechanism which facilitates the use of the lathe to machine an internal surface of a workpiece. An automatic cutting bit feed is located diametrically opposite the cutting bit holder and is connected to it by one or more rigid connecting bars. The bars transmit the feeding movement from a feed slide to the cutting bit holder across the face of the rotating cutting head. A feed screw is attached to an overrunning clutch which is advanced through contact with an actuating arm during each revolution of the cutting head. A clutch nut is provided on the feed screw to release the feed slide and the cutting bit holder from the feed screw to facilitate manual manipulation of these elements. The rate of feed may be adjusted by adjusting the stroke of a cam and overrunning clutch associated with the feed screw.

15 Claims, 9 Drawing Figures

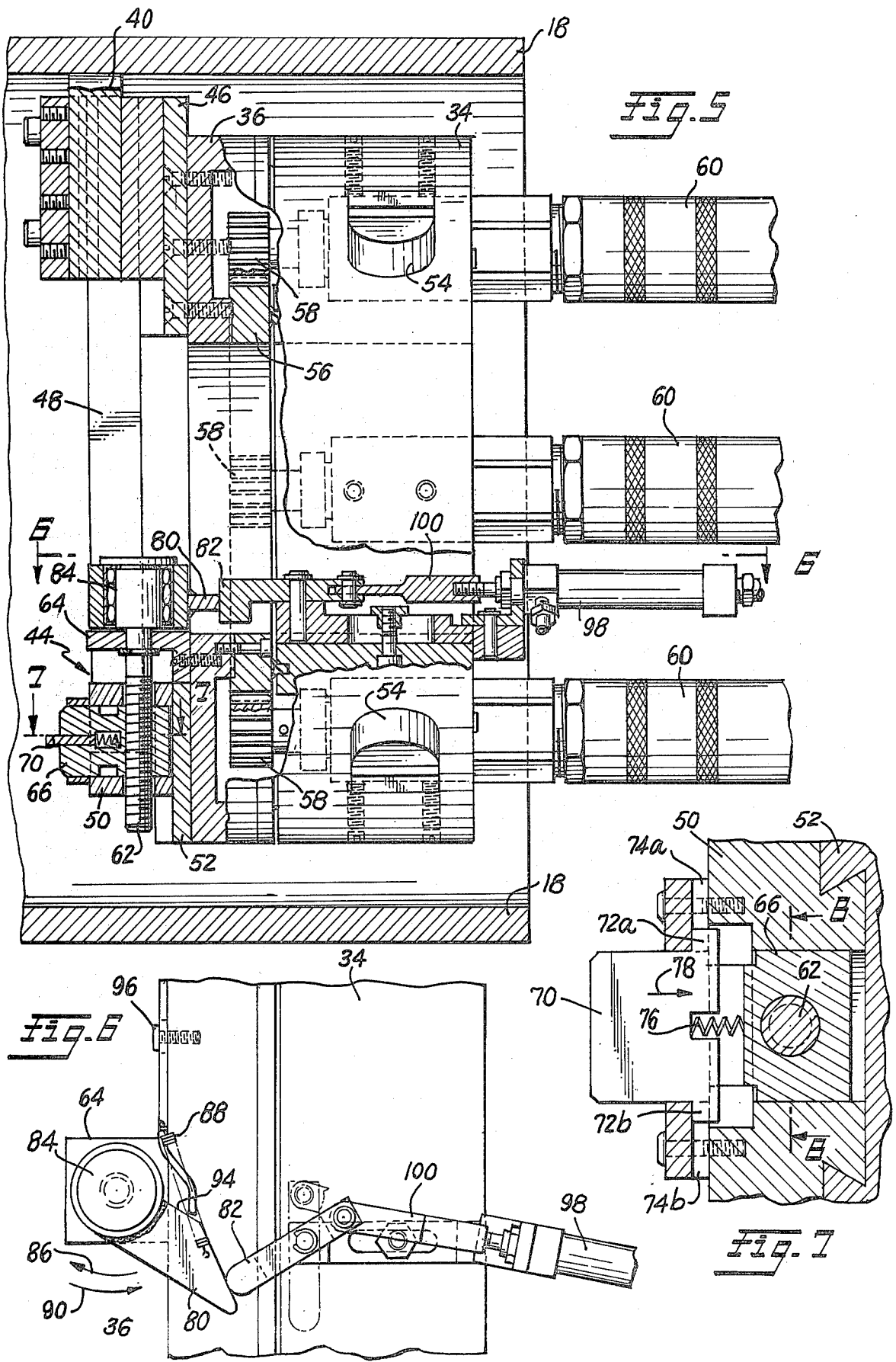

PORTABLE LATHE

FIELD OF THE INVENTION

The instant invention relates to portable lathes, more particularly those lathes adapted to machine the internal surface of a hollow workpiece.

BRIEF DESCRIPTION OF THE PRIOR ART

Portable lathes are well known in the art and typically these comprise a stationary body or housing that is clamped to the pipe, tube or other workpiece, and a cutting or machining head rotatably attached to the stationary housing. The cutting head contains one or more cutting bits and a feeding mechanism which advances the cutting bit into the workpiece. The cutting bit holder is usually mounted on some form of threaded feed screw which is rotated to advance the tool bit as the cutting head completes a rotation.

A common form of feeding mechanism utilized on these lathes comprises a star wheel either attached directly to the feed screw or drivingly connected to it through a worm and pinion gear. In either case, the peripheral extensions of the star wheel contact a fixed finger, usually mounted on the stationary body of the lathe which contact causes the star wheel to rotate a portion of a turn for each revolution of the cutting head. The advancement of the star wheel serves to rotate the feed screw and, consequently, moves the cutting bit toward the workpiece.

These basic systems work fine when the portable lathe is used to machine or cut the external surface of a tubular workpiece since there is no constrictions as to available space for the cutting head and feed mechanism. However, when the lathe is of the internal variety, i.e., utilized to machine or cut the interior surface of a hollow workpiece, the use of the typical star wheel feed mechanism becomes impossible due to the space requirements of this mechanism. The entire rotating cutting head must be capable of fitting within the workpiece and such limitations do not permit any part of the lathe to extend radially beyond the tool bit cutting surface.

The prior art internal lathes are primarily designed to machine or cut the interior area adjacent the end of the workpiece. As a result of this, the apparatus is not designed so as to be fully insertable within the workpiece and, therefore, it is impossible to machine or cut an area located far from the workpiece end, since the internal lathes are incapable of being fully inserted within the opening.

SUMMARY OF THE INVENTION

The instant invention is directed toward an internal, portable lathe having an automatic feed mechanism that is sufficiently compact to enable the lathe to be entirely inserted within an opening in the workpiece. The machine may be positioned virtually at any location along the workpiece so as to be capable of machining or cutting any point along its interior surface.

A particular application of the portable lathe defined by this invention is in the repair of steam generators. Large steam generators have flow restrictors located in the feedwater inlet to control the liquid flow into the heat exchange area. The flow restrictor is welded to a thermo sleeve, via a fillet weld, which sleeve is, in turn, welded to a retainer ring in the feedwater inlet pipe. It is often necessary to remove and replace these devices. Quite obviously, in order to remove them, each of the welds must be cut away. Since all of the welds are in the interior of the feedwater inlet and at least some of them are located well beyond the end of the feedwater inlet, the internal lathe used to machine these welds must be capable of being fully inserted within the interior of the inlet.

It is an object of the present invention to provide an internal, portable lathe that is capable of cutting and removing welds located adjacent the feedwater inlet and also those located at a greater distance from the inlet opening. In order to maintain the compact dimensions required to render the apparatus fully insertable into the feedwater inlet, a unique cutting bit feed mechanism is utilized wherein the feed screw and its associated actuating mechanism is located on the rotating cutting head at a location diametrically opposite the position of the cutting bit and cutting bit holder. A pair of rigid connecting bars interconnect the cutting bit holder with a slide member of the feed mechanism such that any motion of the slide member is transferred to the cutting bit holder. The slide member is caused to move by rotation of a feed screw. A cam member and an overrunning clutch are associated with the feed screw such that, as the cutting head rotates, the cam contacts an actuating arm attached to a stationary portion of the lathe. The movement of the cam member when contacted by the arm causes the feed screw to rotate and advance the cutting bit into the work. When the cam reaches the limits of its travel, a spring biases it to its return position against an adjustable stop. An overrunning clutch is disposed between the cam member and the feed screw such that this return movement of the cam does not transmit movement to the feed screw. The rate of feed may be adjusted by moving the adjustable stop member against the cam which, in effect, controls the amount of travel of the cam and, consequently, the rotation of the feed screw.

In order to allow rapid manual adjustment of the position of the cutting bit the stationary body and the cutting head are annular in shape to enable an operator to reach through the device and manipulate a clutch nut associated with the feed mechanism. In a first position, the nut is threadingly engaged with the feed screw such that, as the feed screw rotates, the feed slide member will transmit the feeding movement of the feed screw to the cutting bit holder. The clutch nut may be manually manipulated to a second position wherein it is disengaged from the feed screw, thereby enabling the slide member and cutting bit holder to be manually shifted either toward or away from the workpiece.

BRIEF DESCRIPTION OF THE DRAWINGS

FIG. 5 is a side elevational view, partially in section, taken along lines 5—5 in FIG. 2 showing the portable lathe according to this invention.

FIG. 6 is a top view of the feed screw actuating mechanism taken along lines 6—6 in FIG. 5.

FIG. 7 is a partial top sectional view taken along lines 7—7 in FIG. 5 showing the clutch nut and locking bar used on the portable lathe according to this invention.

DETAILED DESCRIPTION OF THE PREFERRED EMBODIMENT

Figure 1:
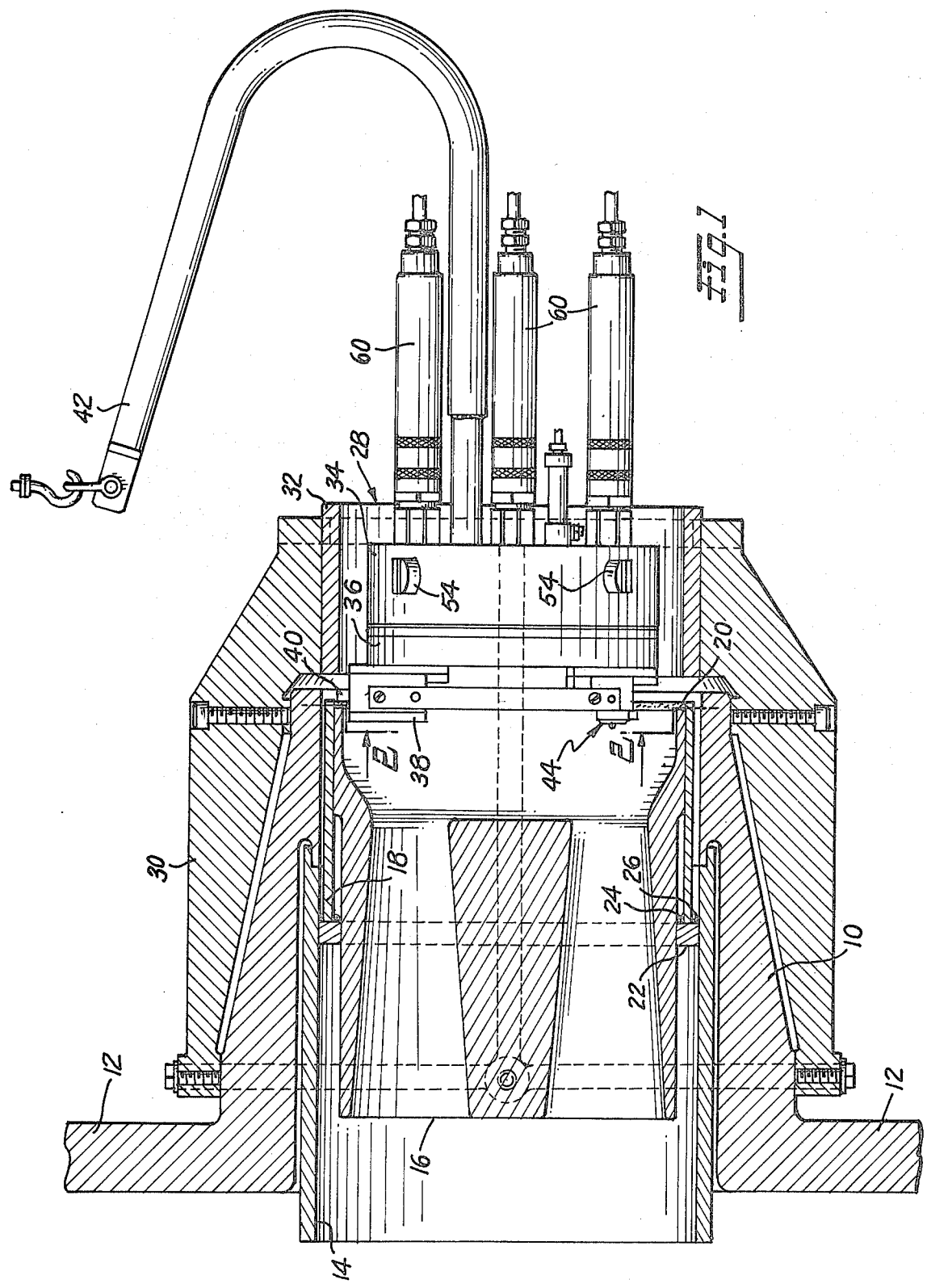
FIG. 1 is a side elevational view, partially in section, showing the portable lathe according to the invention installed in a feedwater inlet.

The portable lathe according to the invention is shown in position in a steam generator feedwater inlet in FIG. 1. Although the invention will be described in conjunction with this usage, quite obviously the invention then may be utilized in any work environment and for either machining or cutting completely through a pipe, tube or conduit.

Feedwater inlet 10 is formed in wall 12 of a steam generator (not shown) to allow feedwater to pass into the heat exchange area of the generator. Feedwater inlet 10 has liner 14 attached thereto. Feedwater flow restrictor 16 is attached to thermo sleeve 18 by way of fillet weld 20 which extends around the inner periphery of thermo sleeve 18. The rear portion of thermo sleeve 18 is, in turn, welded to retainer ring 22 by fillet weld 24. Fillet weld 26 serves to attach retainer ring 22 to liner 14.

After certain periods of usage, it is often necessary to replace the feedwater flow restrictor 16, thermo sleeve 18, and retaininer ring 22. Quite obviously, in order to accomplish this, welds 20, 24, and 26 must be machined away in order to allow the parts to be removed from the generator assembly. The portable lathe according to the invention, indicated generally at 28, is used to effect removal of all three welds. In order to remove the first weld 20, adaptor 30 is attached to the exterior of feedwater inlet 10 such that adaptor sleeve 32 is coaxial with feedwater inlet 10. Portable lathe 28 is placed in position within adaptor sleeve 32 and stationary body 34 is clamped in position. Cutting head 36 is rotated while feeding cutting bit holder 38 and cutting bit 40 radially outwardly to remove weld 20.

Once weld 20 has been removed, lathe 28 and adaptor 30 are removed from the feedwater inlet and the feedwater flow restrictor is removed from the inlet. Lathe 28 is then placed within thermo sleeve 18 such that the cutting bit 30 may remove weld 24 by a similar process. Again, after the removal of weld 24, thermo sleeve 18 is removed from the feed water inlet and a similar procedure is utilized to remove weld 26 holding retainer ring 22 in position.

In order to remove welds 24 and 26, lathe 28 must fit entirely within the feedwater inlet 10. Prior to its being clamped in position, lathe 28 may be supported on cantilever support arm 42 connected to a hoist (not shown).

Figure 2:
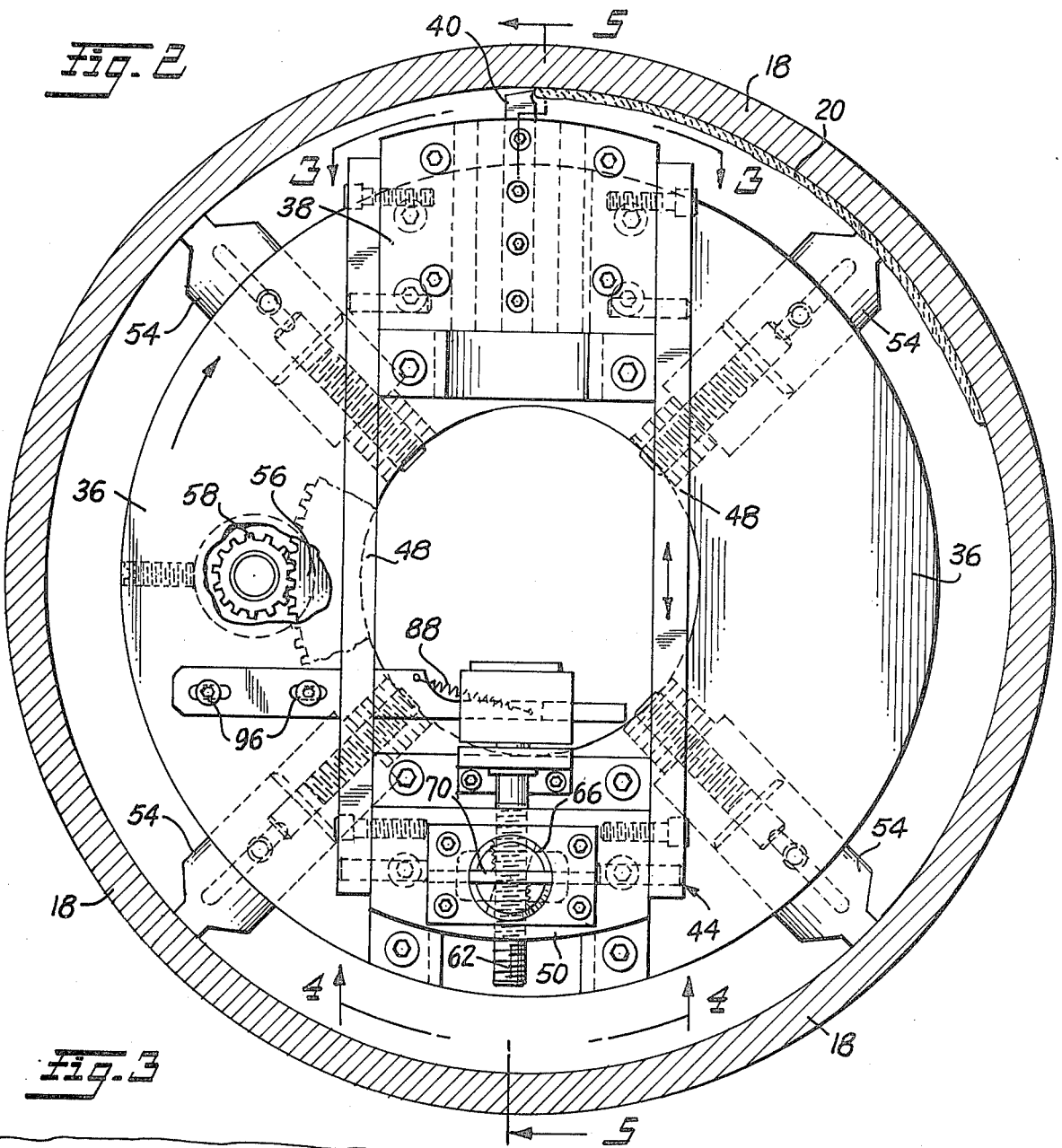
FIG. 2 is a front view of the portable lathe according to the invention viewed along lines 2—2 in FIG. 1.
Figure 3:
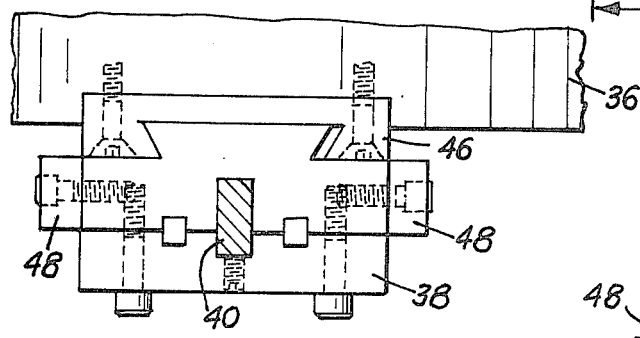
FIG. 3 is a partial top view taken along lines 3—3 of FIG. 2 showing the cutting bit tool holder of a portable lathe according to the invention.
Figure 4:
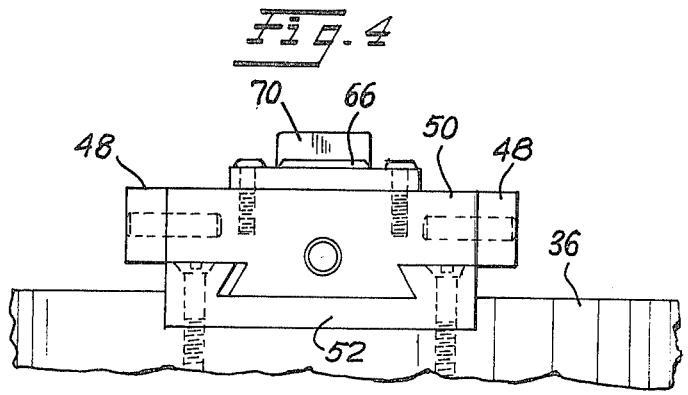
FIG. 4 is a partial bottom view taken along lines 4—4 of FIG. 2 showing the feed asembly slide member of a portable lathe according to the invention.

In order to allow the dimensions of the lathe to be sufficiently compact to fit within the feedwater inlet 10, feed mechanism 44 is located diametrically opposite cutting bit holder 38 on cutting head 36. As seen best in FIGS. 2-4, cutting bit holder 38 having cutting bit 40 retained therein is slidably attached to cutting head 36 via sliding gib 46. This permits cutting bit holder 38 and cutting bit 40 to move radially inwardly or outwardly with respect to cutting head 36. Connecting bars 48 are attached to either side of cutting bit holder 38 and extend across cutting head 36 to feed mechanism 44. The other end of rigid connecting bars 48 are connected to slide member 50 which, in turn, is slidably connected to cutting head 36 via gib 52. Thus, as can be seen, any motion of slide member 50 in a radial direction will be transferred to cutting bit holder 38 via the rigid connecting bars 48.

Stationary body 34 may be retained in position, either in adaptor ring 32 or the feedwater inlet 10 by way of radially extensible feet 54. Feet 54 expand outwardly to contact the interior of the surface to which the stationary body is to be attached. Any known means may be utilized to expand and contract feet 54 with respect to stationary body 34 such as pneumatic or hydraulic cylinders, etc. Although four such feet are shown, the precise number is not critical and greater or fewer numbers may be utilized without exceeding the scope of this invention.

Cutting head 36 is rotably attached to stationary body 34 by roller bearings (not shown) or similar structures. Ring gear 56 is attached to cutting head 36 and teeth on its inner periphery are contacted by pinion gears 58 which are rotably driven by motors 60. Motors 60, which may be pneumatic motors, are attached to stationary body 34 and, as can be seen, rotation of pinion gears 58 will cause rotation of ring gear 56 and cutting head 36. Although three motors 60 are shown, a greater or lesser number may be utilized without exceeding the scope of the invention.

Figure 8:
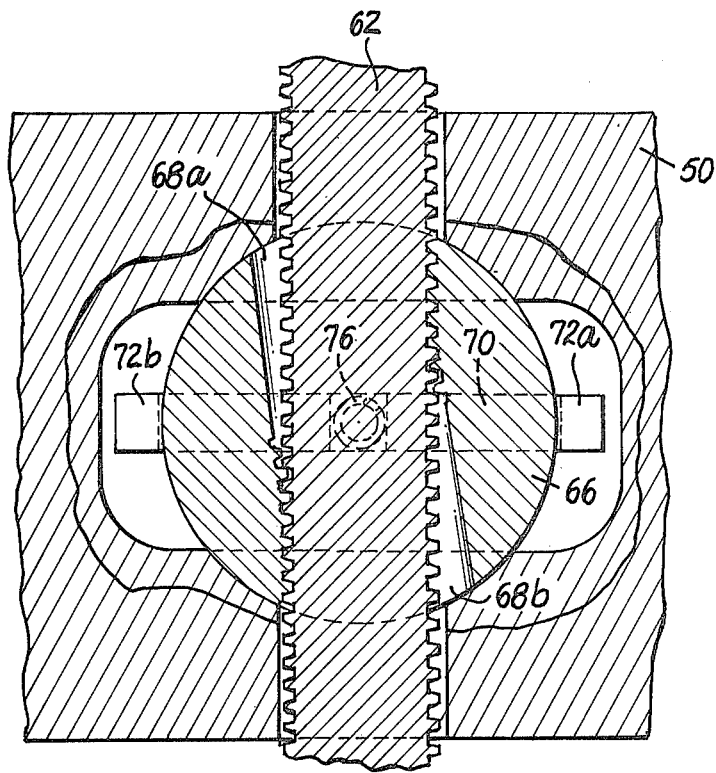
FIG. 8 is an enlarged sectional view taken along lines 8—8 in FIG. 7 showing the clutch nut engaged with the feed screw.
Figure 9:
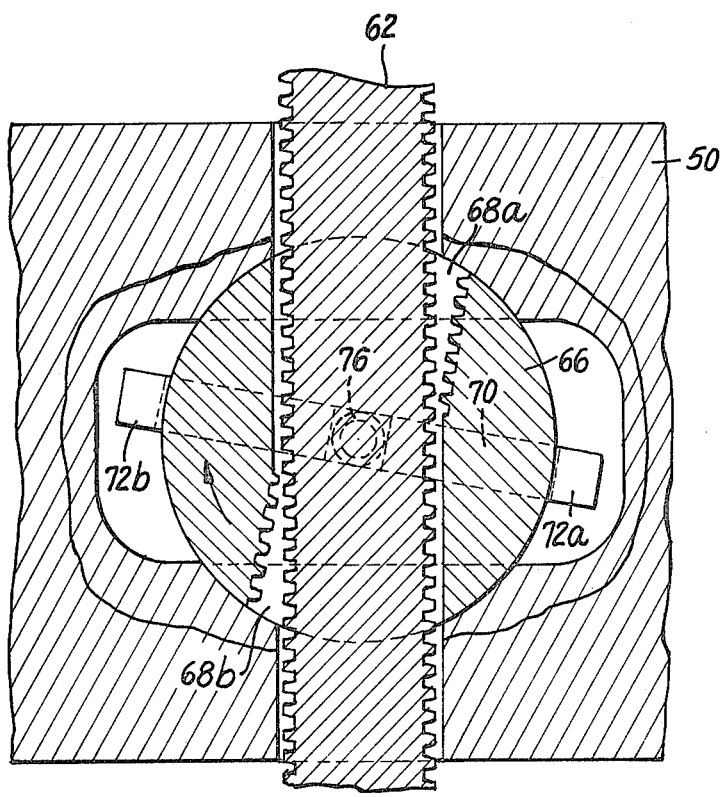
FIG. 9 is an enlarged sectional view taken along lines 8—8 in FIG. 7 showing the clutch nut disengaged from the feed screw.

Feed mechanism 44 is also attached to cutting head 36 at a location diametrically opposite that of cutting bit holder 38. Feed screw 62 is rotatably attached to cutting head 36 via bracket 64. The threaded portion of feed screw 62 passes through slide member 50 and through clutch nut 66. As shown in FIGS. 8 and 9, clutch nut 66 defines bore 68 therethrough which has an upper portion 68a and a lower portion 68b. One half of the circumference of upper portion 68a is threaded while an opposite half of lower portion 68b is also threaded. Clutch nut 66 is movable between a first position, shown in FIG. 8, in which the threaded halves of the upper and lower portions engage corresponding threads on feed screw 62. The threads on both the feed screw and the clutch nut may be Acme threads or similar designs which are capable of transmitting large forces.

When clutch nut 66 is moved to a second position, as shown in FIG. 9, the threaded halves of upper and lower portions 68a and 68b are moved away from the feed screw thread 62 and clutch nut 66 is disengaged therefrom. Since there is no connection between feed screw 62 and slide member 50 at this point, slide member 50 may be manually moved without regard to feed screw rotation.

In order to facilitate the movement of clutch nut 66 between its two positions, locking bar 70 is provided. Locking bar 70 is slidably retained in clutch nut 66, as shown in FIGS. 5 and 7, in a slot such that rotation of the locking bar 70 will cause rotation of clutch nut 66. Locking bar 70 has laterally extending tabs 72a and 72b which extend beyond the diameter of clutch nut 66. In a first position, shown in FIG. 7, tabs 72a and 72b engage corresponding notches 74a and 74b defined by slide member 50. When biased in this position by coil spring 76, the interengagement of tabs 72 with notches 74 prevent locking bar 70, and consequently clutch nut 66, from being rotated from their respective first positions. Thus, by the interengagement of these tabs and notches, clutch nut 66 is locked in its engaged position, as shown in FIG. 8. In this position, all rotation of feed screw 62 will be converted into longitudinal movement of slide member 50 and, consequently, cutting bit holder 38.

Movement of locking bar 70 in the direction of arrow 78 will disengage tabs 72 from notches 74 and allow locking bar 70 and clutch nut 66 to be rotated to their second position, as shown in FIGS. 9. This serves to disconnect the slide member 50 from feed screw 62 and allows it to be manually positioned without regard to feed screw rotation.

Rotation of the feed screw is effected through cam 80 and actuating arm 82. Cam 80 is attached to feed screw 62 through an overrunning clutch device 84. Overrunning clutch 84 is such that, when cam 80 is moved in the direction of arrow 86, it causes the feed screw 62 to also rotate in that direction. After the cam passes by actuating arm 82, spring 88 causes it to pivot in the direction of arrow 90 back to its original position. During this return movement, clutch 84 disconnects cam 80 from feed screw 62 such that the feed screw does not return to its original position. The initial position of cam 80 is determined by adjustable stop 92, one end of which bears against notch 94 on cam 80. Stop 92 is attached to cutting head 36 via screws 96 or the like, such that its position may be altered by loosening screws 96 and physically moving adjustable stop 92. Movement of this stop effectively limits the travel of cam 80 and, in turn, the rotation of feed screw 62, thereby serving as an adjustment to the feed rate of the cutting bit 40. The smaller the angle of rotation of cam 80, the smaller will be the amount cutting bit 40 is advanced into the workpiece per rotation of cutting head 36.

Actuating arm 82 is pivotally attached to stationary body 34 such that it is pivotable between a first position, shown in solid lines in FIG. 6, and a second position, shown in phantom in FIG. 6. In the first position, actuating arm 82 extends into the path of cam 80 as cutting head 36 rotates with respect to stationary body 34. In its second position, actuating arm 82 is removed from the path of cam 80. Arm 82 is moved between its two positions via pneumatic cylinder 98 attached to stationary body 34. Cylinder 98 has its piston rod 100 attached to actuating arm 82. Thus, as piston rod 100 is extended and retracted, actuating arm 82 moves between its first and second positions, and vice versa. Although a pneumatic cylinder 98 is shown, any other of means may be provided to move the actuating arm without exceeding the scope of this invention.

As can be seen from the foregoing description, as cutting head 36 rotates with respect to stationary body 34, the interaction between cam 80 and actuating arm 82 will advance the feed screw 62 in one direction only due to the presence of overrunning clutch 84. Once the cut has been completed, lathe 28 may be removed from the device and feed assembly 44 manually reset by unlocking clutch nut 66 from engagement with feed screw 62 and manually repositioning the slide assembly 50 and, consequently, cutting tool bit holder 38.

The foregoing description has been presented for purposes of illustration only and should not be construed as in any way limiting the scope of this invention which is solely determined by the appended claims.

We claim:

1. A portable lathe comprising:
   (a) a stationary body having a central axis;
   (b) means to attach the stationary body to a workpiece;
   (c) a cutting head rotatably attached to the stationary body so as to rotate about the central axis;
   (d) means to rotate the cutting head about the central axis;
   (e) a cutting bit holder;
   (f) means slidably attaching the cutting bit holder to the cutting head;
   (g) a feed mechanism movably attached to the cutting head and located on a side of the central axis opposite the cutting bit holder, the feed mechanism comprising a feed slide assembly slidably attached to the cutting head and a feed screw rotatably attached to the cutting head and threadingly engaging the feed slide assembly, the feed slide assembly having:
   (i) a slide member slidably attached to the cutting head;
   (ii) a clutch nut rotatably mounted on the slide member,
   the clutch nut defining a bore extending therethrough, the bore having an upper portion and a lower portion, the upper portion having threads extending around approximately half the circumference on one side of the bore and the lower portion having threads extending around approximately half the circumference on an opposite side of the bore such that when the clutch nut is in a first position, the threaded halves of the upper and lower portions engage threads on the feed screw thereby causing the slide member to move as the feed screw rotates, and when the clutch nut is in a second position, the threaded halves are out of engagement with the feed screw thereby enabling the slide member to be moved independently of the feed screw rotation; and
   (h) connecting means comprising at least one connecting bar having one end connected to the slide member and the other end connected to the cutting bit holder such that, as the feed mechanism moves toward the central axis, the cutting bit holder is moved away from the central axis and vice versa.

2. The portable lathe of claim 1 wherein the threads on the clutch nut and the feed screw are Acme threads.

3. The portable lathe of claim 1 wherein the slide member defines a notch on either side of the clutch nut, and further comprises a locking bar slidably attached to the clutch nut, the locking bar having tabs extending beyond the periphery of the clutch nut such that, in a first position of the locking bar, the tabs engage the notch thereby preventing rotation of the clutch nut and locking it in its first position, and in a second position of the locking bar, the tabs are disengaged from the notches thereby allowing the clutch nut to be rotated to its second position.

4. The portable lathe of claim 3 further comprising spring biasing means interposed between the locking bar and the clutch nut to bias the locking bar toward its first position.

5. The portable lathe of claim 4 further comprising means to rotate the feed screw in the given direction at least a portion of a turn during each revolution of the cutting head.

6. The portable lathe of claim 5 wherein the means to rotate the feed screw comprises:
   (a) a cam attached to the feed screw;

(b) an actuating arm pivotally attached to the stationary body and movable between a first position wherein it contacts the cam so as to rotate the feed screw, and a second position wherein it does not contact the cam; and, (c) means to move the actuating arm between its first and second position.

7. The portable lathe of claim 6 further comprising and overrunning clutch assembly interposed between the can and the feed screw which allows rotation of the feed screw only in the given direction.

8. The portable lathe of claim 7 further comprising:

(a) a spring interposed between the cam and the cutting head which biases the cam in a predetermined direction; and, (b) an adjustable stop bearing against the cam so as to limit its movement in the predetermined direction.

9. The portable lathe of claim 8 wherein the means to move the actuating arm comprises a pneumatic cylinder attached to the stationary body and having its piston rod attached to the actuating arm.

10. The portable lathe of claim 1 further comprising means to rotate the feed screw in the given direction at least a portion of a turn during each revolution of the cutting head.

11. The portable lathe of claim 10 wherein the means to rotate the feed screw comprises:

(a) a cam attached to the feed screw;

(b) an actuating arm pivotally attached to the stationary body and movable between a first position wherein it contacts the cam so as to rotate the feed screw, and a second position wherein it does not contact the cam; and, (c) means to move the actuating arm between its first and second position.

12. The portable lathe of claim 11 further comprising an overrunning clutch assembly interposed between the cam and the feed screw which allows rotation of the feed screw only in the given direction.

13. The portable lathe of claim 12 further comprising:

(a) a spring interposed between the cam and the cutting head which biases the cam in a predetermined direction; and (b) an adjustable stop bearing against the cam so as to limit its movement in the predetermined direction.

14. The portable lathe of claim 13 wherein the means to move the actuating arm comprises a pneumatic cylinder attached to the stationary body and having its piston rod attached to the actuating arm.

15. An internal portable lathe for machining the interior of a workpiece having an opening therein comprising:

(a) a stationary body having a central axis, the dimensions of the stationary body being such that it fits entirely within the opening of the workpiece;

(b) radial attaching means mounted on the stationary body comprising a plurality of radially outwardly extending feet which contact the interior surface of the workpiece opening so as to attach the stationary body thereto;

(c) a cutting head rotatably attached to the stationary body so as to rotate about the central axis;

(d) a ring gear attached to the cutting head;

(e) at least one motor attached to the stationary body, the motor having an output shaft and a pinion gear mounted on the shaft engaging the ring gear such that rotation of the motor output shaft causes the cutting head to rotate with respect to the stationary body;

(f) a cutting bit holder slidably attached to the cutting head on one side of the central axis;

(g) a slide member slidably attached to the cutting head on a side of the central axis opposite the cutting bit holder;

(h) at least one rigid connecting bar having one end attached to the slide member and the other end attached to the cutting bit holder, such that, as the slide member moves toward the central axis the cutting bit holder moves away from the central axis and vice versa;

(i) a feed screw rotatably attached to the cutting head and extending through the slide member;

(j) a clutch nut rotatably mounted on the slide member such that it is rotatably movable between a first position wherein it threadingly engages the feed screw thereby causing the slide member to move toward the central axis as the feed screw is rotated, and a second position wherein it is disengaged from the feed screw thereby enabling the slide member to be manually moved independently of the feed screw rotation;

(k) a locking bar slidably attached to the clutch nut and having tabs extending beyond its periphery such that, in a first position of the locking bar, the tabs engage a notch defined by the slide member thereby preventing rotation of the clutch nut and locking it in its first position, and in a second position of the locking bar, the tabs are disengaged from the notch thereby allowing the clutch nut to be rotated to its second position;

(l) spring biasing means interposed between the locking bar and the clutch nut to bias the locking bar toward its first position;

(m) a cam attached to the feed screw;

(n) an overrunning clutch interposed between the cam and the feed screw which allows rotation of the feed screw in only one direction;

(o) an actuating arm pivotally attached to the stationary body and movable between a first position wherein it contacts the cam as the cutting head rotates thereby rotating the feed screw, and a second position wherein its does not contact the cam;

(p) a spring interposed between the cam and the cutting head which biases the cam in a predetermined direction;

(q) an adjustable stop mounted on the cutting head and bearing against the cam so as to limit its movement in the predetermined direction; and, (r) a pneumatic cylinder attached to the stationary body and having its piston rod connected to the actuating arm so as to move the arm between its first and second positions.

* * * * *